United States Patent Office 3,849,510
Patented Nov. 19, 1974

3,849,510
HYDROGEN TRANSFER PROCESS
Federico Maspero, Milan, and Emilio Perrotti, San Donato Milanese, Italy, assignors to Snam Progetti, S.p.A., San Donato Milanese, Italy
No Drawing. Filed Oct. 13, 1971, Ser. No. 189,050
Claims priority, application Italy, Oct. 13, 1970, 30,898/70
Int. Cl. C07c 5/02, 5/18
U.S. Cl. 260—680 R                                    6 Claims

ABSTRACT OF THE DISCLOSURE

An unsaturated organic compound (A) is hydrogenated by a hydrogen donor organic compound (B) by reacting first compound (A) with second compound (B) in the presence of a complex of a Group VIII metal, e.g., Ir, Fe, Co, Ni, Rh, Ru, Pd or Pt, the metal being at a low valence state or reducible to such a state under the reaction conditions. Illustratively, hexene in the presence of $IrH_3(P\emptyset_3)_2$ provides hexadiene and hexane, and 3-methyl-2-butene in the presence of $(Ir(P\emptyset_3)_2)_2$ provides isoprene and isopentane.

---

The present invention relates to the hydrogenation of an unsaturated organic compound through the use of an organic compound which is a hydrogen donor. More particularly, the present invention refers to the preparation, with a high yield and selectivity as to the steric configuration, of unsaturated compounds and particularly of dienes.

The present process can be carried out in an homogeneous phase or it can be performed indifferently in heterogeneous phase.

More particularly, the present invention relates to a process which permits an increase in the unsaturation number of a starting compound which exhibits at least one unsaturation. Another object of the present invention is to introduce into a starting organic compound a second unsaturation which is conjugated with a preexistent one.

It is known that it is possible to prepare compounds having two conjugated unsaturations in unsaturated starting compounds. In a general sense, the more recent industrial processes consist of a catalytic oxidation to yield, for instance, butadiene from butenes (and other dienes from the corresponding starting olefines having the same number of carbon atoms as the desired diene). The catalysts employed and the procedures followed in such a type of process are essentially the same as those of the ammoxidation reactions, i.e. the reaction which allows unsaturated nitriles to be obtained from olefines, ammonia and oxygen. Another recent process is the olefines disproportioning, according to which a diene and an olefine are obtained from a molecule of a different diene and olefine. A third process of a quite different type, since the reaction is carried out between an acetylene unsaturated compound and a carbonyl compound, is the one based on the so-called ethynation reaction according to which an acetylenic alcohol is obtained, to be subsequently hydrogenated to ethylenic alcohol, the latter giving the desired conjugated diene by dehydration.

We have now discovered a simple and economical process which enables products interesting from the industrial point of view to be obtained from compounds which originally possess at least one unsaturation. According to the process of our invention it is possible to obtain, as a final product, a compound having more unsaturations than it started with. This is an important result in that it allows one to obtain, as a final product, a more unsaturated compound and therefore a potentially more reactive compound. A further important result is the possibility of introducing conjugated unsaturations into a starting olefine to give a conjugated diene.

The process according to the invention is of general application and consists essentially in reacting an unsaturated hydrocarbon compound in the presence of particular catalysts which are hydrogen transferors, yielding an unsaturation and at the same time a hydrogenation of another compound whose unsaturation is therefore reduced. Therefore, a more unsaturated compound and also a less unsaturated one, compared with the starting ones, are obtained as final products.

The reactants behave, in the presence of suitable catalysts, partially has hydrogen donors and partially as hydrogen acceptors, while the catalysts have the function of hydrogen transferors. The reactants can be selected from the class of unsaturated hydrocarbons, that is to say, the hydrocarbons having at least one ethylenic unsaturation, but other kinds of unsaturation may also be present.

The hydrogen transfer process can also be applied to functional unsaturated compounds; in which case the groups present in the molecule can be nitrile, ester or ether groups. The unsaturated molecules can also be chosen from the class of the cyclic olefines; in other words, according to the process of our invention it is possible to dehydrogenate norbornene or alkylnorbornenes or other unsaturated cyclic hydrocarbons, for instance, to yield compounds having an endo- or exocyclic conjugated diene structure; which are interesting monomers for terpolymerization.

The reactants employed in the practice of our invention shall not necessarily be of different types or natures since the process can also be carried out when employing only one type of unsaturated hydrocarbon as starting reactant; in which case it is possible to obtain, for instance, butadiene and butane starting from butene. On the other hand, when the starting reactants are different unsaturated hydrocarbons, it is possible to obtain, as reaction product, a hydrocarbon having more unsaturations hydrogenating in the same time the other hydrocarbon to saturated compound. In that case, the selection of the olefine as hydrogen acceptor is performed on the basis of economical requirements or the possibility of the use of the saturated compound.

It is to be noted that in some particular cases, disclosed in a copending application No. 147,653, filed May 27, 1971, acetylene compounds can be taken into account: for instance, the hydrogen transfer can be obtained on isopentene and 3-methyl-1-butyn-3-ol to yield as final products isoprene and 3-methyl-1-buten-3-ol, the latter being an isoprene precursor by employing a simple dehydration reaction. The hydrogen-transfer reaction can be carried out in this case with high yield owing to the high selectivity of the hydrogenation reaction on the acetylene group to ethylenic group, as disclosed in the copending patent application.

When an olefin is employed as hydrogen acceptor, the selection should be based, beside economical and industrial reasons, on the selectivity degree required and the operative conditions should be related to the concentrations, thermodynamic and kinetic conditions and the electronic factors which affect the relative coordination of the olefines employed. As aforesaid, the process according to the present invention yields conjugated dienes having a well defined steric configuration: for instance, the process when applied to linear hexenes yields trans, trans-2,4-hexadiene with high yield and steric purity.

The process according to our invention employs, as catalysts, VIII group metal compounds. The complexes of the following metals are particularly effective: Fe, Ni, Ir, Rh, Ru, Co, Pd and Pt, wherein the metals are in a low oxidation state, more particularly in the range −1 to +1. However, in some cases, particularly when the metal is Ir, Rh or Co, said metals may also be in the formal oxidation state +3 but are capable, taking into account the ligand present in the complex, of a primary reductive process, for instance they may be hydride or allyl complexes.

The more effective metal ligands are: olefines, hydrides and diolefines, halogens, trialkyl- and triaryl-phosphines, halogen-alkyl- or halogen-aryl-phosphines, arsines, stibines, nitrosyls, nitro- and nitro-nitrosyls and particularly aromatic phosphines in a new class of complexes wherein the metal is in the zero oxidation state with intermetallic ligands described in the formula:

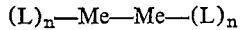

wherein Me represents a metal of the VIII group of the Periodic Table as Fe, Ni, Ir, Rh, Ru, Co, Pd; L is a compound capable of forming complexes with M as phosphines, arsines, stibines, which can also be alkyl-, aryl-, alkylaryl-halogenalkyl- or halogenaryl-substituted and preferably aromatic phosphines; $n=2, 3, 4$, which are prepared through the new process disclosed in U.S. 3,773,814.

The aforesaid compounds exhibit a high affinity for the C—H bond, are soluble in the hydrocarbons and stable against atmospheric agents; and, through an activation process which may be carried out with molecular hydrogen in the reaction medium or with protic compounds as water and mono- or poly-hydroxyl alcohols, perform reactions of "hydrogen-transfer" with high yields and selectivity, particularly as to the steric configuration of the obtained diolefine. The more active complexes in these reactions are those wherein the metal (Me) is Co, Rh or Ir having a structure corresponding to the formula (I) or halogen and hydride complexes like $MeXL_3$, $MeX_3L_2$ for instance, $IrH\emptyset_3$, $IrH_3\emptyset_2$, $IrCl\emptyset_3$, $((COD)RhCl)_2(\emptyset_2Ir)_2$ etc. $\emptyset$=triphenyl-, trialkyl-, chlorodialkylphosphines, stibines, arsines, etc., COD=cyclic or acyclic diolefine, L may be $\emptyset$, cyano-olefine, X=halogen, nitrosyl, nitro, hydride, etc.).

The reaction takes place in the presence of a solvent which is an inert solvent or reactant kept in the liquid phase. The inert solvent is a simple or functional group substituted aliphatic, cyclic or aromatic hydrocarbon. The temperature may vary between 50° C. and 200° C., preferably at the boiling point of the mixture. The reaction is carried out in an inert atmosphere, preferably in the presence of a small amount of hydrogen, or mixtures of nitrogen-hydrogen or hydrogen and other inert gas. A small amount of protic substances is equally effective. The reaction pressure may vary from the atmospheric pressure up to 20 atm.

The following examples illustrate the invention, but are not to be intended as limitative thereof:

EXAMPLE 1

$1.5 \times 10^{-1}$ mmole of $IrH_3(P\emptyset_3)_2$ (($P\emptyset_3$)=triphenylphosphine) was added to 10 ml. of of hexene in a glass vessel. The mixture was heated under stirring at 110° C. in an inert atmosphere; in a few minutes the complex dissolved; starting from this moment, considered as zero time, the solution was controlled by gas chromatography at regular intervals of time (on a 20% EAS column at 60° C.). The drawings were effected with an interval of 15 minutes. The chromatographic analysis revealed, besides the isomerization of hexene-1 to hexene-2 and hexene-3, the catalytic formation of hexene hexadienes. The same sample introduced into the mass spectrography-chromatographic apparatus showed that the structure of the promoter diene is 2,4-hexadiene trans-trans.

After 1.5 hours the quantitative gas chromatographic analysis indicated the formation of 1.2 mmoles of hexadiene and 1.3 moles of hexane without formation of other compounds and with practically quantitative yield with respect to the transformed products.

EXAMPLE 2

$0.92 \times 10^{-1}$ mmole of $(Ir(P\emptyset_3)_2)_2$ was dissolved in 10 ml. of hexene-2 and poured into a glass vessel at room temperature. The solution was poured in a $H_2$ and $N_2$ atmosphere (50% vol./vol.) and heated to 120° C. The same procedure as in the previous example was followed for the identification of the reaction products.

The gas chromatographic and mass spectrometric analysis showed the catalytic production of hexadiene and hexane in an almost equimolecular ratio. After 75 minutes the solution revealed a content of trans-trans 2-4 hexadiene and hexane respectively of 1.54 mmoles and 1.63 mmoles.

After the solution was dried the unaltered catalyst was recovered on the basis of the spectrometric IR comparison with the starting compounds.

EXAMPLE 3

According to the preceding example the reaction was carried out with 3-methyl-2-butene at a temperaure of 130° C. and in the presence as a diluent of chlorobenzene (50% vol./vol.) previously distilled and degassed. The results of the mass spectrometry-gas chromatographic quantitative analysis indicated the catalytic formation of monomer isoprene and isopentane with quantitative yields in comparison with the transformed olefine and in a concentration respectively of 1.77 and 1.84 mmoles without any formation of by-products.

What we claim is:
1. A process for transforming an olefinic compound into a mixture of compounds which comprise a compound that is the corresponding saturated hydrocarbon and a compound that is the corresponding diolefin, said process comprising passing an olefin over $(Ir(P(C_6H_5)_3)_2)_2$, said process being carried out at a pressure equal to or higher than atmospheric pressure.

2. Process according to claim 1 wherein the reaction temperatures are in the range 50° C. to 200° C.

3. Process according to claim 1 wherein the pressure ranges from atmospheric pressure to a pressure of 20 atmospheres.

4. Process according to claim 1 wherein the reaction is carried out in an inert atmosphere.

5. Process according to claim 1 wherein said olefin is the process solvent.

6. A process for transforming an olefinic compound into a mixture of compounds which comprise a compound that is the corresponding saturated hydrocarbon and a compound that is the corresponding diolefin, said process comprising passing hexene over
$(Ir(P(C_6H_5)_3)_2)_2$,
said process being carried out in an inert solvent at a pressure equal to or higher than atmospheric pressure.

References Cited

UNITED STATES PATENTS

| | | | |
|---|---|---|---|
| 3,458,547 | 7/1969 | Coffey | 260—683.9 X |
| 3,641,174 | 2/1972 | Lyons | 260—680 X |
| 3,631,218 | 12/1971 | Carter et al. | 260—683.2 |
| 3,453,302 | 7/1969 | Pregaglia et al. | 260—683.9 X |

PAUL M. COUGHLAN, JR., Primary Examiner

U.S. Cl. X.R.

260—666 PY, 683.2, 683.9